United States Patent [19]

Sakakibara et al.

[11] Patent Number: 4,895,236
[45] Date of Patent: Jan. 23, 1990

[54] ACTUATOR FOR THE FRICTIONAL ENGAGING DEVICE

[75] Inventors: Shiro Sakakibara, Toyokawa; Takaharu Fukaya, Kariya, both of Japan

[73] Assignee: Aisin-Warner Kabushiki Kaisha, Anjo, Japan

[21] Appl. No.: 149,242

[22] Filed: Jan. 27, 1988

[30] Foreign Application Priority Data

Feb. 2, 1987 [JP] Japan ................................. 62-37543

[51] Int. Cl.⁴ ............................................. F16H 1/445
[52] U.S. Cl. .................... 192/84 R; 192/94; 74/711; 180/247
[58] Field of Search .................... 192/84 R, 90, 94; 74/711, 710.5; 180/233, 247

[56] References Cited

U.S. PATENT DOCUMENTS

| | | | |
|---|---|---|---|
| 3,235,045 | 2/1966 | Pop | 192/94 |
| 3,400,610 | 9/1968 | Taylor et al. | 74/710.5 |
| 3,419,118 | 12/1968 | Allaben, Jr. | 192/84 R |
| 3,448,635 | 6/1969 | Nelson | 74/710.5 |
| 4,263,824 | 4/1981 | Mueller | 74/711 |
| 4,417,641 | 11/1983 | Kageyama | 180/233 |
| 4,591,034 | 5/1986 | Tellert et al. | 192/84 R |
| 4,805,486 | 2/1989 | Hagiwara et al. | 74/711 |

FOREIGN PATENT DOCUMENTS 513823 12/1930 Fed. Rep. of Germany .... 192/84 R

Primary Examiner—Leslie A. Braun
Assistant Examiner—David A. Testardi
Attorney, Agent, or Firm—Kanesaka and Takeuchi

[57] ABSTRACT

An actuator for a four wheel drive transfer mechanism which is laid in a power transmission device and is controlled by an electrical signal sent from a controlling unit comprises a torque generating mechanism which converts electrical energy into a torque, and a torque-thrust conversion mechanism which converts the torque generated by the torque generating mechanism into a thrust force. The thrust force generated from the torque-thrust conversion mechanism is applied to the frictional engaging device to control torque distribution between front and rear vehicle wheels.

10 Claims, 15 Drawing Sheets

ACTUATOR FOR THE FRICTIONAL ENGAGING DEVICE

BACKGROUND OF THE INVENTION

1. Field of the Invention

The present invention relates to an actuator to operate a frictional engaging device such as a frictional clutch and a frictional brake, etc., in particular relates to an actuator which converts revolutionary force into thrusting force mechanically.

2. Description of the Prior Art

A power transmission device of a motor vehicle in general such as an automatic transmission or a four wheeel driving device uses a frictional engaging device such as a multiple disc clutch, multiple disc brake (or band), and a differential lock clutch (full-time) or a two or four-wheel switching clutch (part time) to control each component of a planetary gear mechanism.

Previously the frictional engaging device has employed a hydraulic actuator (hydro-thrust conversion mechanism) comprising a piston and a cylinder to press or release the discs.

And as shown in FIG. 2 the mechanism employing the hydraulic actuator works an oil pump by the revolution of an engine, regulates an oil pressure generated by the pump by a hydraulic control mechanism such as a regulator valve, and sends the regulated oil pressure to the hydro-thrust conversion mechanism comprising the actuator through a hydraulic switching mechanism made up by a control valve, etc. at required moment.

By the hydro-thrust conversion mechanism hydraulic pressure is converted into thrust force, the thrust force is applied to the frictional engaging device made up by a multi disc clutch, etc. through a frictional engaging pressing mechanism, and the frictional engaging device is engaged. And this time a sensor detects throttle pressure, vehicle speed and running condition, and sends such signals to a controlling portion (CPU). The electrical signals are sent to each solenoid to control the hydraulic control mechanism and the hydraulic switching mechanism at the required moment.

Furthermore as shown in FIG. 3, as an another example, a solenoid type clutch and brake which converts electric power into thrust force directly without using hydraulic pressure is shown.

Accordingly in the case of hydraulic pressure the problems of oil leakage, response delay, difficulty of precise control and complexity of the mechanism come out, and reliability is sacrificed because the electric signals once are conveted into hydrualic pressure.

In addition if hydro-system is employed an oil pump is required as a source of hydraulic pressure application. The oil pump is directly connected to an engine to work, however the engine itself is not provided exclusively for the oil pump. And the revolution of the engine varies, so, utilizing the engine output to work the oil pump has to have loss and needs extra effort to take out the output of the engine. Another case employs an electric motor to work the oil pump, however this case requires a space for the motor. Consequently such space has to be considered in spite of the space in a vehicle being limited, and efficiency is sacrificed because electric power which is controlable with ease is converted into hydraulic pressure.

On the other hand the mechanism utilizing solenoid power directly has no problems regarding hydraulic pressure mentioned above, however the devices become big and heavy to get transmission power and braking power tantamount to the mechanism utilizing hydraulic power.

The present invention is purposed to provide an actuator for frictional engagement which enables precise and quick control though a size of the device and is comparatively small.

SUMMARY OF THE INVENTION

While the invention is believed to be readily understood from the above description, a brief summary will now be set forth.

As shown in FIG. 1, a mechanism comprises a torque generating mechanism such as AC or DC motors and ultra sonic motor, which converts electric energy to torque; and a torque-thrust conversion mechanism, which converts torque obtained from a bolt mechanism (including ball thread mechanism) a cam mechanism and so on into thrust force with an increase of force. And the thrust force converted by the conversion mechanism is applied to a frictional engaging device such as multiple disc clutch, multiple disc brake and band brake, etc. by a frictional engaging pressing mechanism such as a pressing rod, etc.

In FIG. 1 to FIG. 3, the areas enclosed by long and short dash lines have similar functions in the respective drawings, dotted lines between structures mean electric connection, and double lines between structures mean hydraulic connection.

Based on the above structure, when a control unit generates signals in accordance with signals from sensors detecting the throttle opening and the vehicle speed electric energy based on the electric signals is conveted into torque by the torque generating mechanism. The torque is converted into thrust force by the torque-thrust conversion mechanism, and the thrust force operates to engage or release the frictional engaging device through the frictional engaging pressing mechanism. At this time, large thrust force is obtained by a torque amplification mechanism (such as a counter gear, worm gear, planetary gear, harmonic drive, antifriction drive and a reduction gear, etc.) situated between the torque generating mechanism and the torque-thrust conversion mechanism; a power amplification mechanism such as a lever mechanism situated between the torque-thrust conversion mechanism and the frictional engaging pressing mechanism; or, providing power amplification function to the torque-thrust conversion mechanism by itself by employing a small lead angle thread.

BRIEF DESCRIPTION OF THE DRAWINGS

In the accompanying drawings.

DETAILED DESCRIPTION OF THE PREFERRED EMBODIMENT

Explanations are conducted on the present invention along by the drawings.

Figure 1:
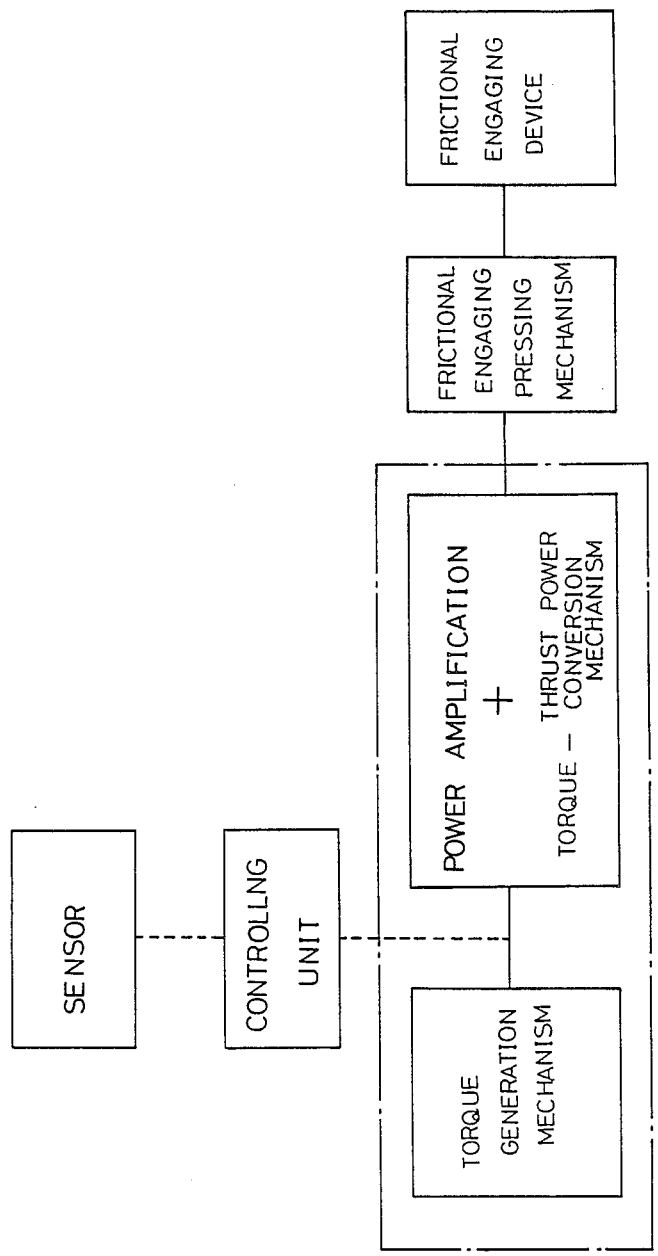
FIG. 1 is a block diagram which shows the function relating to the present invention.
Figure 2:
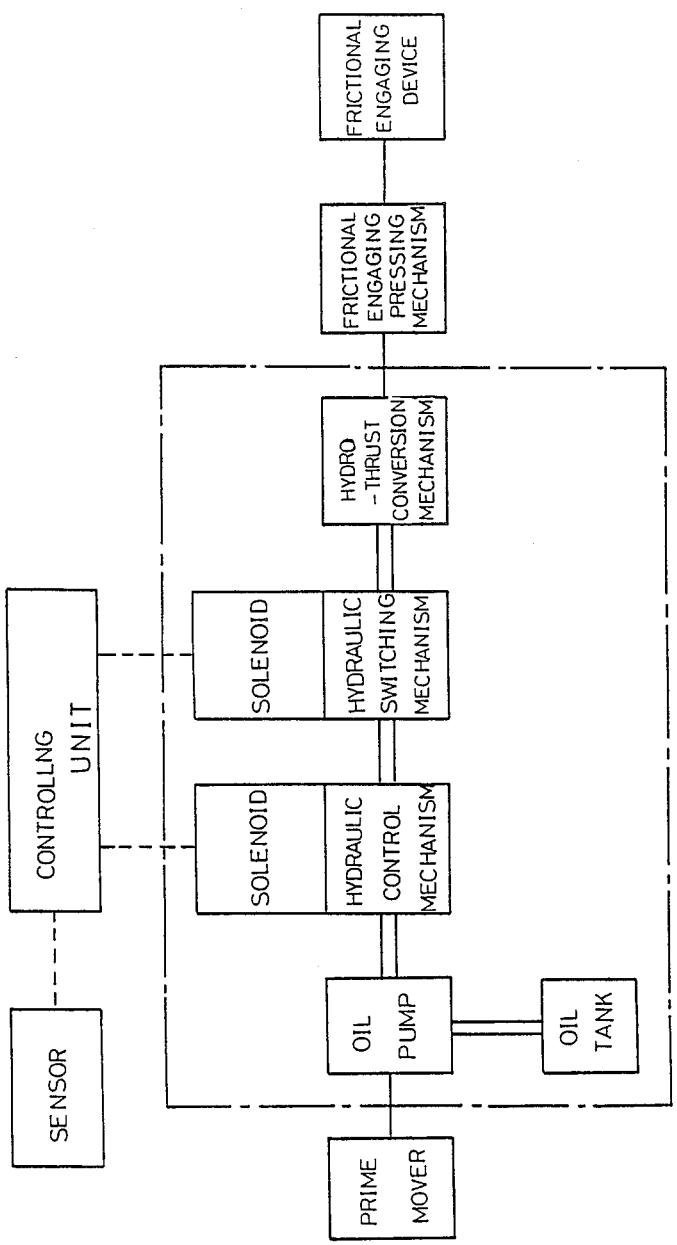
FIG. 2 is a block diagram which shows the function of the prior art.
Figure 3:
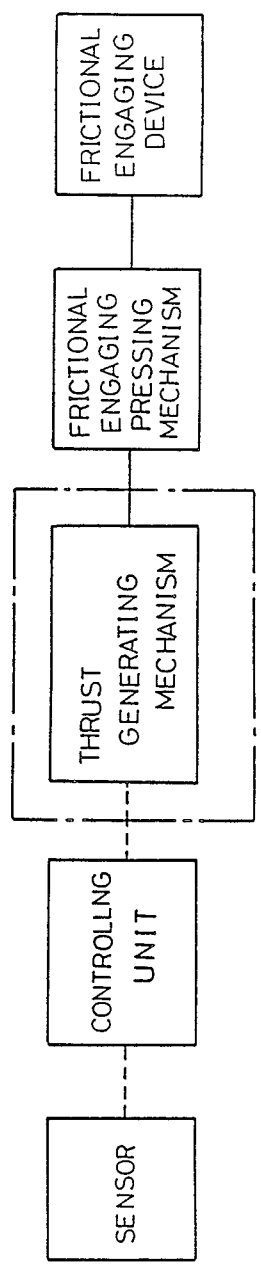
FIG. 3 is a block diagram which shows the function of the prior art.
Figure 4:
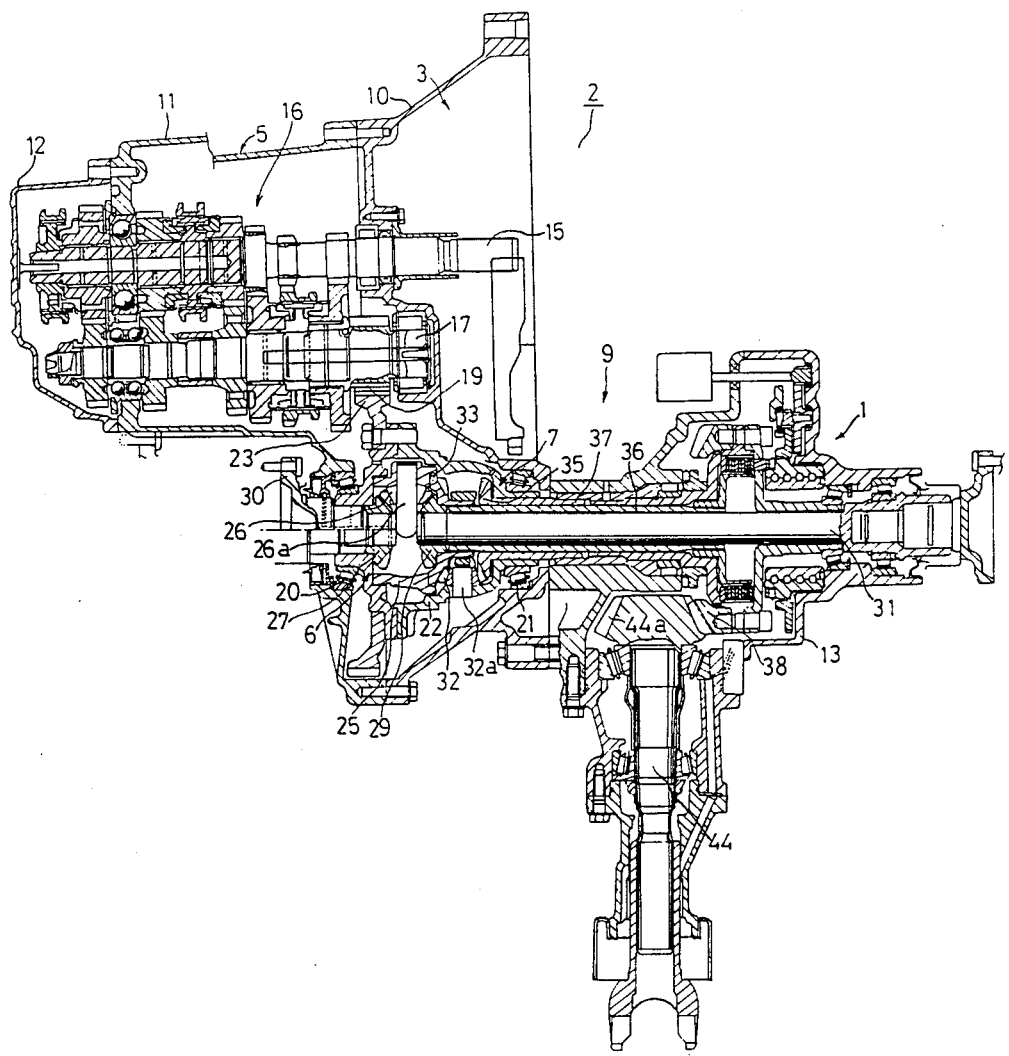
FIG. 4 is a front cross sectional view of the power transmission device to which the present invention is applied.
Figure 5:
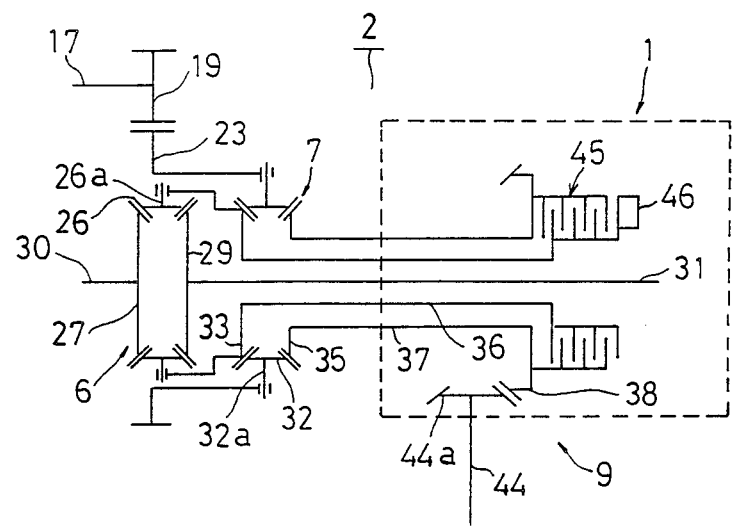
FIG. 5 is a schematic veiw of the power transmission device shown in FIG. 4.

A power transmission device 2 in a four wheel drive vehicle of full time type as shown in FIG. 4 and FIG. 5 comprises a clutch portion 3 (only case is shown), a transmission mechanism 5, a front differential 6, a center differential 7 and a transfer portion 9. And these are contained in a transaxle housing 10, a transaxle case 11, a transaxle cover 12 and a transfer case 13. An actuator 1 for a frictional engaging device to regulate or release differential function of the center differential is laid in the transfer portion 9. The transmission mechanism 5 comprises a multiple speed gear transmission device 16 which is shifted by the operation of a lever at the required moment. The revolution of an input shaft 15 is changed to respective forward speed and reverse speed through the multiple speed gear transmission device 16, and transmitted to an output gear 19 fixed on a shaft 17. Furthermore a mount case 22 is supported by tapered roller bearings 20, 21 relative to the case 10, 11, and an input gear 23 is fixed to the mount case 22. The input gear 23 and the output gear 19 mesh each other, and the mount case 22 is rotated due to the rotation of the input gear 23. The center differential 7 is laid in the mount case 22. A pinion shaft 32a supporting a pinion 32 is vertically arranged and is free rotationally supported by the case 22, and right and left side gears 33, 35 are also free rotationally supported by the case 22. The left side gear 33 is made together with a front differential carrier 25. A pinion shaft 26a supporting a pinion 26 is vertically arranged and is free rotationally supported by the differential carrier 25, and right and left side gear 27, 29 are laterally long and are also free rotationally supported also by the differential carrier 25. And front axles 30, 31 are connected to each side gear 27, 29 so that transmission is enabled. This structure makes up a front differential 6. A hollow shaft 36 enclosing the front axle 31 is connected to the left side gear 33 of the center differential 7 so that transmission is enabled. A hollow shaft 37 enclosing the hollow shaft 36 and the front axle 31 are connected to the right side gear 35 so that transmission is enabled, and a friction clutch 45 which is functioned by the actuator 1 for the frictional engaging device is laid between the hollow shaft 37 and the hollow shaft 36.

Figure 6:
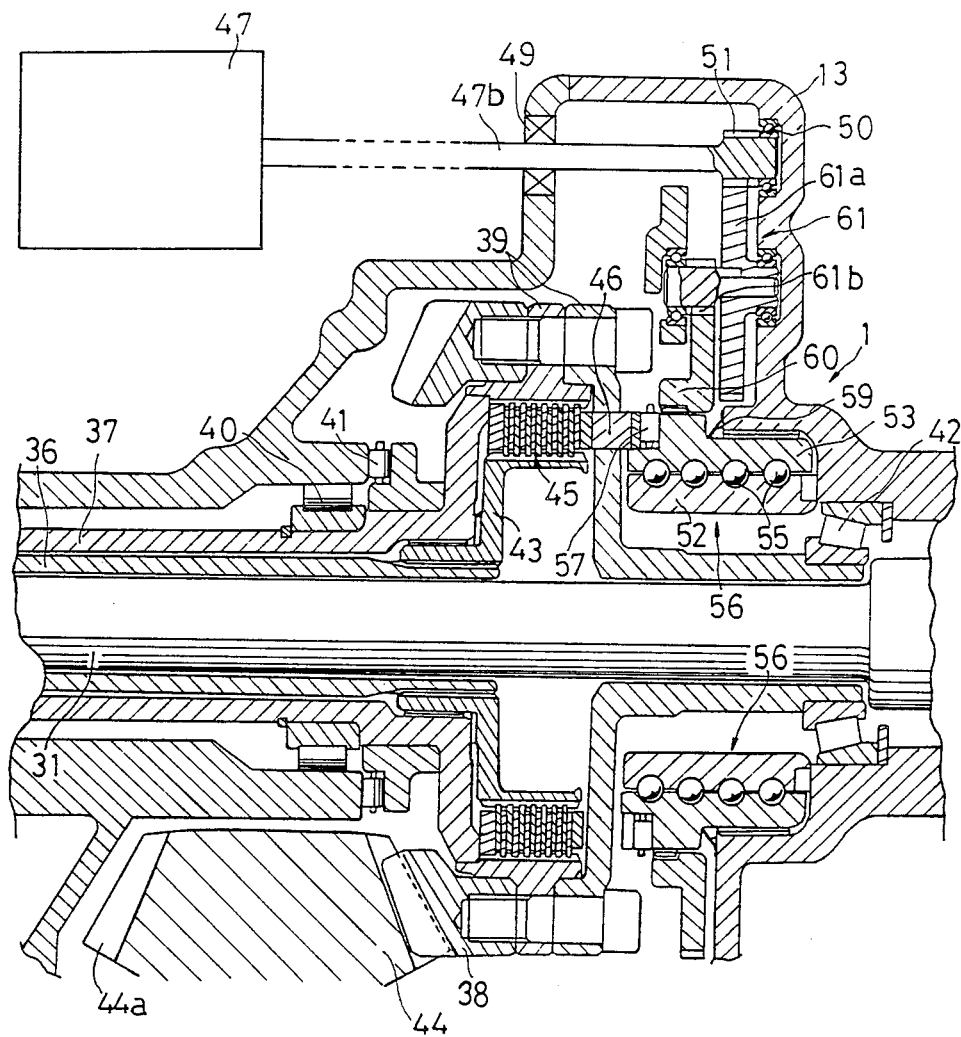
FIG. 6 is a detailed view of the actuator for frictional engaging.

The portion of the actuator 1 is shown in FIG. 6. As shown in FIG. 6, a gear mount case 39 is free rotationally supported by a radial roller bearing 40, a thrust bearing 41 and a tapered roller bearing 42 in the transfer case 13. Outside the gear mount case 39, a transfer output gear 38 is fixed by bolt, and meshes with a gear 44a of a drive shaft 44. Further, inside the gear mount case 39, a hub 43 is fixed on the hollow shaft 36. A multiple disc type frictional clutch 45 is laid between the hub 43 and the gear mount case 39, and one end of the clutch 45 is supported by the gear mount case 39 and the other end contacts a pressing rod 46. And in the vicinity of the transfer case 13, a DC (direct current) motor 47 is laid. An output shaft 47b is inserted into the transfer case 13 by through a seal bearing 49 and is free rotationally supported by a bearing 50, and a gear 51 is fixed at the edge of the shaft 47b. At the right side of the gear mount case 39, a ball thread mechanism 56 comprising a torque-thrust conversion mechanism having a hollow male thread 52, a hollow-female thread 53 and many steel balls 55 is laid. The male thread 52 is restrained in the axial direction by the transfer case 13. Further, the female thread 53 is free rotationally supported by the case 13, and the end of the female thread 53 contacts the pressing rod 46 through a thrust bearing 57. A coned disc spring 59 is laid between the femal thread 53 and the transfer case 13. The coned disc spring 59 gives pressure to the friction clutch 45 through the female thread 53 to keep proper response. A gear 60 is fixed on the female thread 53 by spline, and a reduction gear 61 which decreases the revolution and increase the torque is free rotationally supported in the transfer case 13. The reduction gear 61 comprises a large diameter gear 61a and small diameter gear 61b, the former (61a) meshes with the gear 51, and the latter (61b) meshes with the gear 60.

The rotation of wherein the engine is transmitted to the transmission mechanism 5 through the clutch portion 3. At the transmission mechanism 5, the rotation is shifted to required speed, then, transmitted to the output gear 19, and to the mount case 22 through the input gear 23. In normal four wheel running, the rotation of the mount case 22 is transmitted to the left and right side gear 33, 35 from the pinion 32 of the center differential 7. Further the rotation of the left side gear 33 is transmitted to the friction clutch 45 through the hollow shaft 36, and to the pinion 26 of the front differential 6 through the differential carrier 25. From the pinion 26, the rotation of the left side gear 33 is further transmitted to the left and right gears 27, 29 and the left and right front axle 30, 31. On the other hand, the rotation of the right side gear 35 is transmitted to the mount case 39 through the hollow shaft 37, and from the mount case 39, the rotation is transmitted to the drive shaft 44 through the transfer output gear 39 and the gear 44a. Further, the rotation of the right side gear 35 is transmitted to the both right and left rear axles through the rear differential (not shown in FIG.).

In the case of skid due to snow, frozen road surface, etc. or the tire(s) being caught by wayside groove, the controlling portion receives the signals from each sensor (not shown in FIG.) detecting the opening of the throttle, the vehicle speed, etc., or receives the signals from a driver through switches, and the controlling portion sends the signals to the DC motor 47 to rotate up to the required amount of rotation. The rotation of the DC motor 47 is transmitted to the reduction gear 61 from the gear 51; by the reduction gear 61, the rotation is decreased and the torque is increased; the rotation of the reduction gear 61 is transmitted to the gear 60. The rotation of the gear 60 moves the female thread 53 in the ball bolt mechanism 56 to the left of the axial direction, and then the torque is converted into the thrust force. Furthermore, the female thread 53 presses the pressing rod 46 through the bearing 57 to engage the frictional clutch 45. Under this condition, the center differential 7 does not perform the differential motion, so the hollow shaft 36 (front) and the hollow shaft 37 (rear) rotate together. And the rotation of the shafts 36 and 37 is transmitted to the differential carrier 25 and the drive shaft 44. Due to this the same rotational speed is transmitted to the front and rear wheels, so that the condition which is unable to transmit due to skid is prevented.

In addition to the above, in accordance with the figures, from FIG. 7 to FIG. 21, the modified plans of the present invention are explained. The portions same as those in FIG. 4 or FIG. 6 are given same numbers and explanation is deleted.

Figure 7:
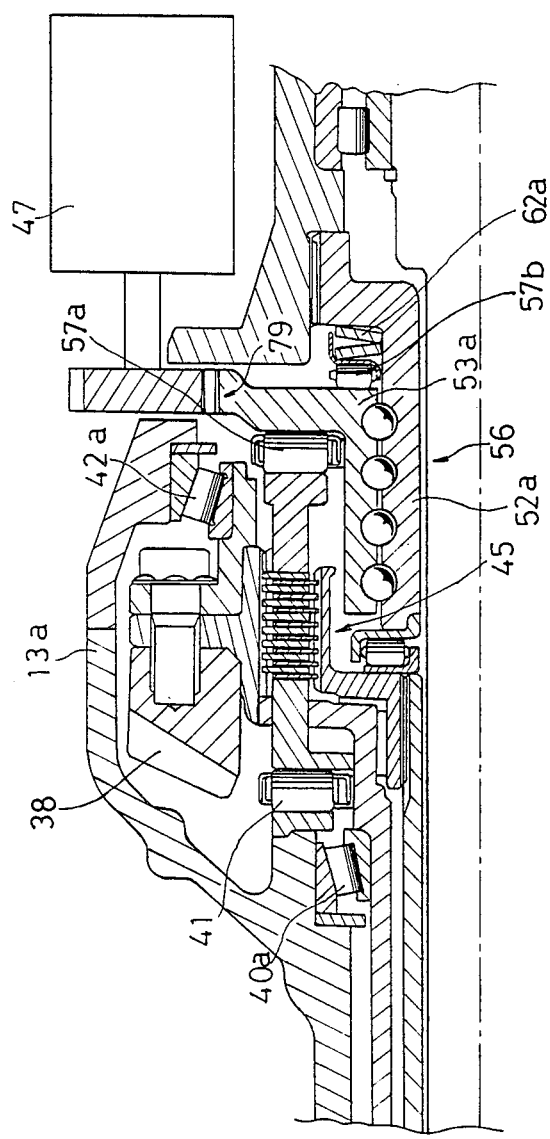

The example shown in FIG. 7 is that the thrust force generated from the transfer output gear 38 which is a hypoid gear is sustained by the case 13a through the tapered roller bearings 40a, 42a; and the thrust force generated from the ball bolt mechanism 56 and applied to the frictional clutch 45 is sustained by the case 13a through the thrust bearings 41 and 57a.

Namely the bearings are respectively allocated for sustaining of the thrust force generated from the transfer output gear 38, and the thrust force generated from the ball bolt mechanism. Consequently the load which is sustained by bearings is reduced and the durability of the bearings is expanded.

Figure 8:
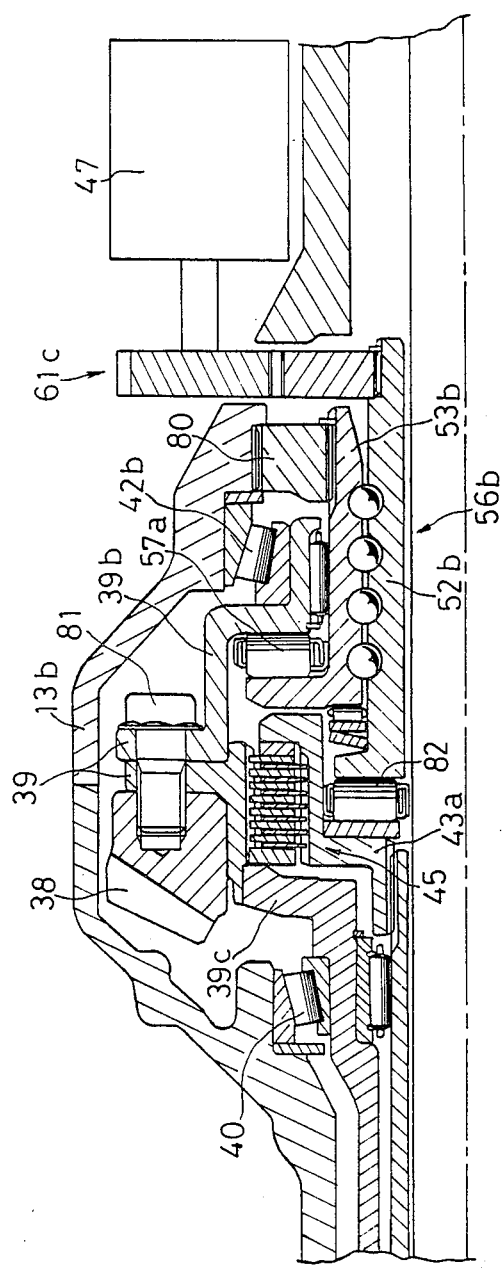

The example shown in FIG. 8 is that the female thread 53b in the ball bolt mechanism 56b is fixed to the ring 80 which has spline on both outside and inside, so that the female thread 53b is movable axially without rotation. And the ring 80 is connected to the transfer case 13b, and, the male thread 52b and the motor 47 are connected through the redution gear 61c.

Due to the above, during engagement of the frictional clutch 45 the axial force to the right direction is applied to the female thread 53b. This axial force is also applied to the right side of the mount case 39b. On the other hand, the axial force to the left direction on the male thread 52b is applied for engaging the frictional clutch 45, and applied to the left side of the mount case 39c. Accordingly, the thrust force generated from the ball bolt mechanism 56b is sustained by the bolt 81 only. Because of this the thrust force is not transmitted to the transfer case 13b, so that the weight of the transfer case 13b is reduced.

Figure 9:
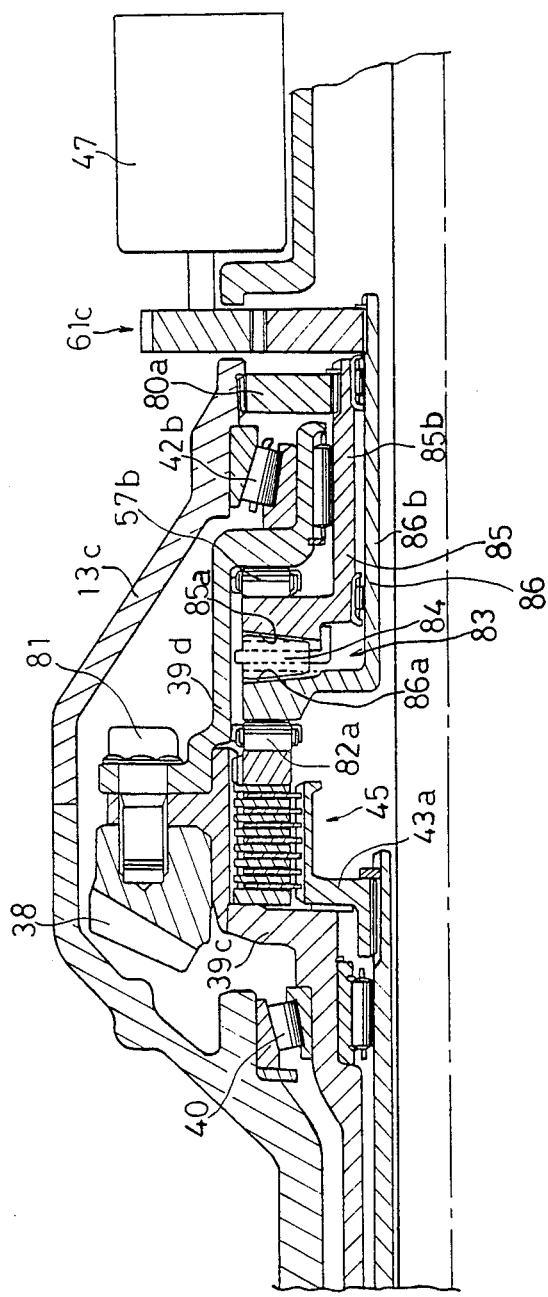

The example shown in FIG. 9 is that the cam mechanism 83 is employed for the torque thrust conversion mechanism. The cam mechanism 83 comprises; the roller 84; the cam 85 which has the cam surfce 85a and the hub 85b connected to the transfer case 13c by the ring 80a; the hub 85b axially movable without rotation; and the cam 86 having the cam surface 86a and the hub 86b free rotationally supported inside the hub 85b. The cam 86 is connected to the reduction gear 61c through the hub 86b.

Consequently, when the roation of the motor 47 is transmitted to the cam 86 through the reduction gear 61c, the cam mechanism 83 moves axially by the relative rotation between the cam 86, and the cam 85 whose rotation is restrained by the ring 80a. The thrust force generated by this axial move is applied to the frictional clutch 45 and engages the clutch 45. On the other hand, the reaction force to the thrust force applied to the clutch 45 is sustained by the bolt 81 through the thrust bearing 57b and the right side mount case 39d. And the thrust force applied to the frictional clutch 45 through the thrust bearing 82a is sustained by the bolt 81 through the left side mount case 39c. Due to the above, the transfer case 13c is reduced in weight because the thrust force converted by the cam 83 is sustained by the bolt 81 only and no thrust force is transmitted to the case 13c.

Figure 10:
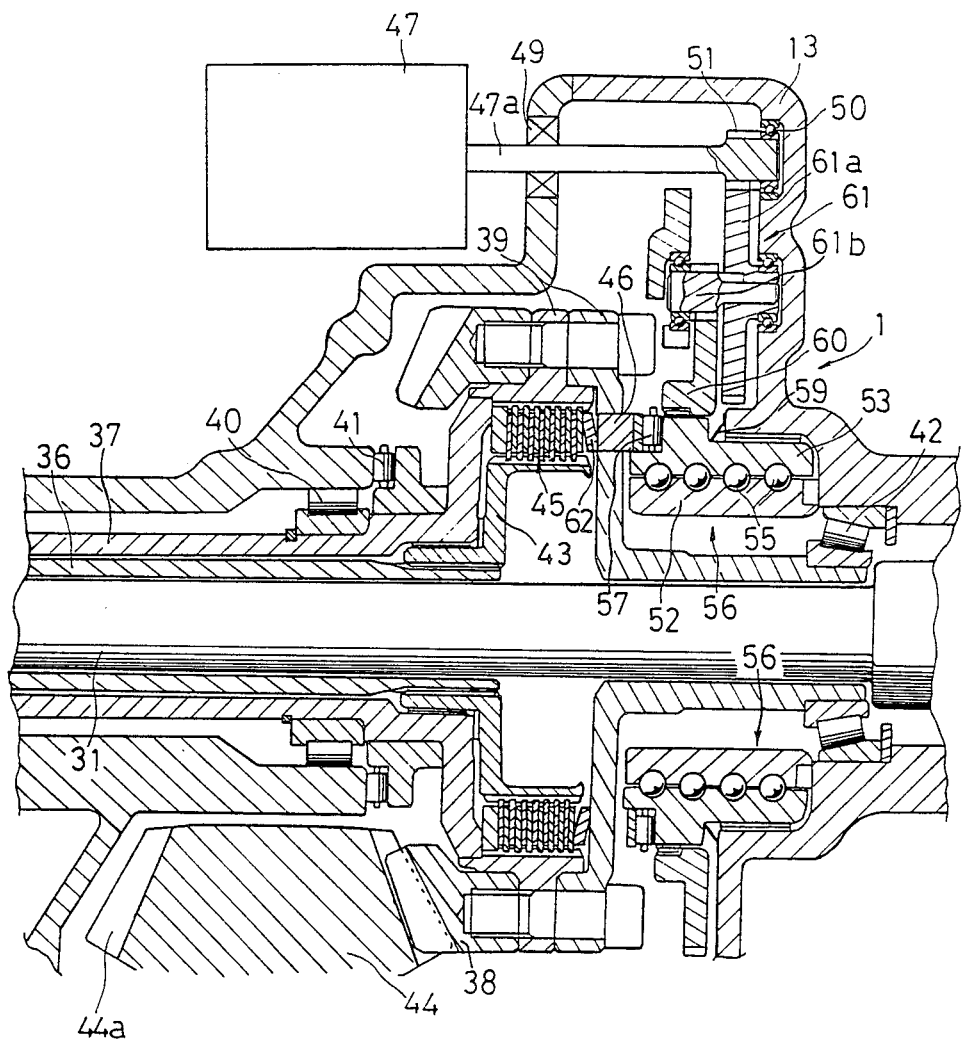

The example shown in FIG. 10 is that the coned disc spring 62 is laid between the frictional clutch 45 and the pressing rod 46. Due to the spring 62 the vibration from the clutch 45 is absorbed in the spring 62, so that such vibration is not transmitted to the torque-thrust conversion mechanism 56 including the ball-bolt mechanism 56. Further, instead of the spring 62, other elastic materials such as rubber can accomplish the same objective. And the spring 62 can be laid in any place between the motor 47 and the clutch 45.

Figure 11:
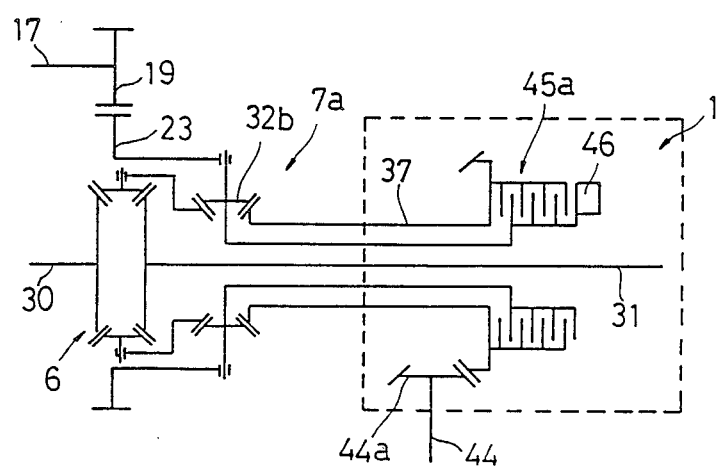
FIG. 7 to FIG. 21 are views of embodiments which are different respectively.

The example shown in FIG. 11 is that the actuator for frictional engaging 1 is laid on the friction clutch 45a for the differential motion located between the input pinion 32b for the input of driving force of the center differential 7a and the rear output pinion 37.

Figure 12:
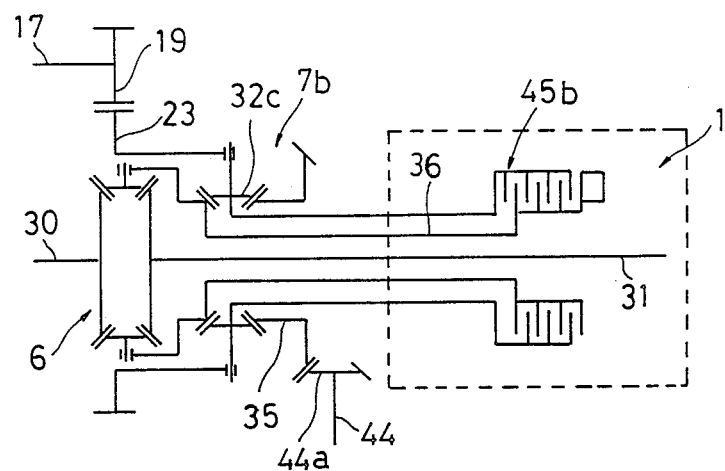

The example shown in FIG. 12 is that the actuator 1 for frictional engaging is laid in the friction clutch 45b located between the input pinion 32c for the input of driving force and the output shaft 36. And the right side gear 35 of the center differential 7b directly meshes with the rear driving ger 44a.

Figure 13:
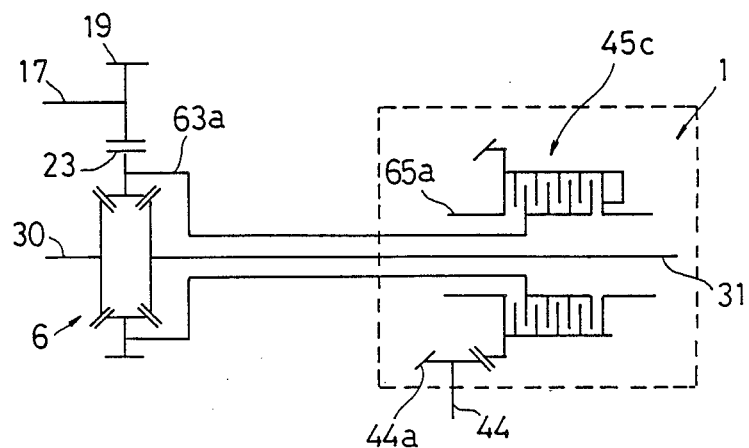

The example shown in FIG. 13 is that the actuator 1 for frictional engaging is laid in the friction clutch 45c to transmit the driving force generated from the input shaft 36a of the four wheel driving vehicle (part time system) without having the center differential (FF based) to the output shaft 65a.

Figure 14:
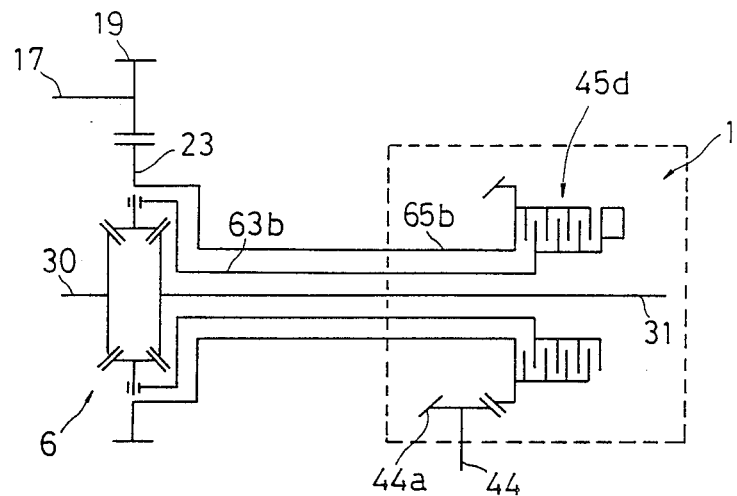

The example shown in FIG. 14 is that the actuator 1 for frictional engaging is laid in the friction clutch 45d to transmit the driving force generated from the input shaft 65b of the four wheel drive vehicle without having the center differential (FR based) to the output shaft 63d.

Figure 15:
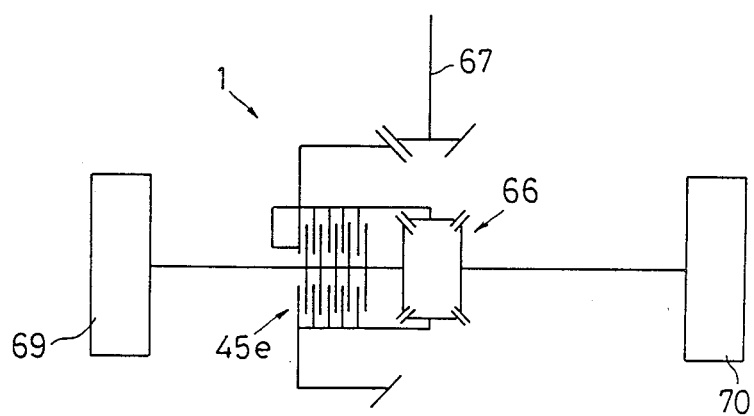

The example shown in FIG. 15 is that the actuator 1 for frictional engaging is laid in the friction clutch 45e, as the differential lock mechanism for the rear differential 66, which is located between the input shaft 67 and the left rear wheel 69. Not limited to this, it is possible to locate the acutator 1 for frictional engaging in the friction clutch which is laid between the input shaft 67 and the right rear wheel 70, or the left rear wheel 69 and the right rear wheel 70.

Figure 16:
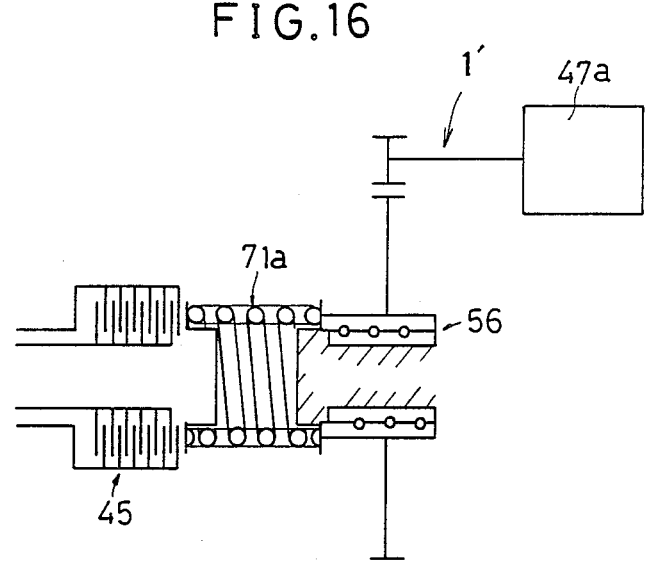
Figure 17:
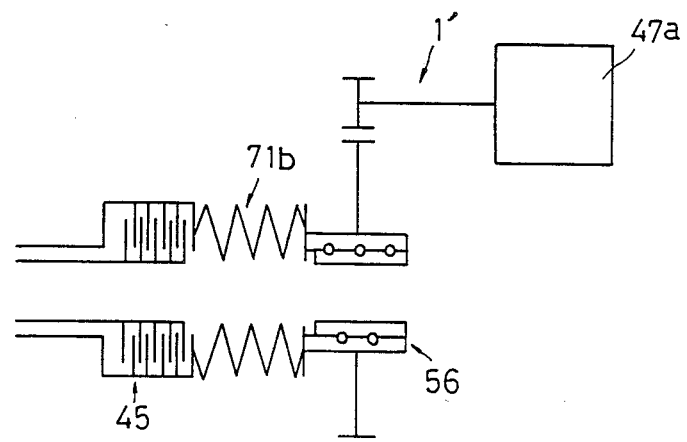

The example shown in FIG. 16 and FIG. 17 are that as a torque generator the servo motor 47a, wherein rotational number or angle of rotation can be controlled, is used, and the long stroked coil spring 71a or the coned disc spring 71b is laid between the friction clutch 45 and the ball bolt mechanism 56. Consequently, the friction clutch 45 is engaged in proportion to the amount of shrinking of the spring 71a or 71b. And the amount of shrinking is proportional to the revolution of the motor 47a, so by controlling the revolution of the motor 47a the engaging force for the friction clutch is also controlled. Further, not to limit to the above springs, the same effects are obtained by employing long stroked elastic elements.

Figure 18:
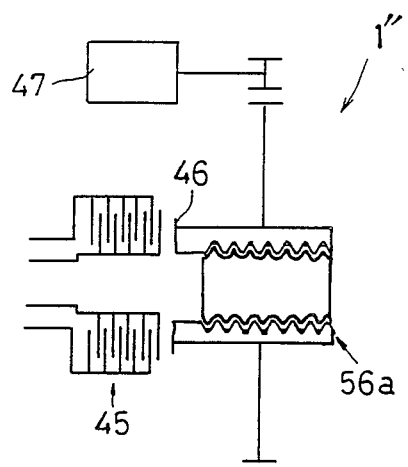

In the example shown in FIG. 18, in place of the ball thread mechanism, normal thread mechanism is employed. For example the square thread 56a is used. The length in diametral direction is reduced because no balls are employed in the mechanism. And the DC motor 47 works only when the engaging force of the clutch 45 is changed because since friction of the mechanism is large accordingly, the thread does not regress while the DC motor 47 is off. Still further the thrust force is amplified by making the lead angle of the square thread mechanism 56a small.

Figure 19:
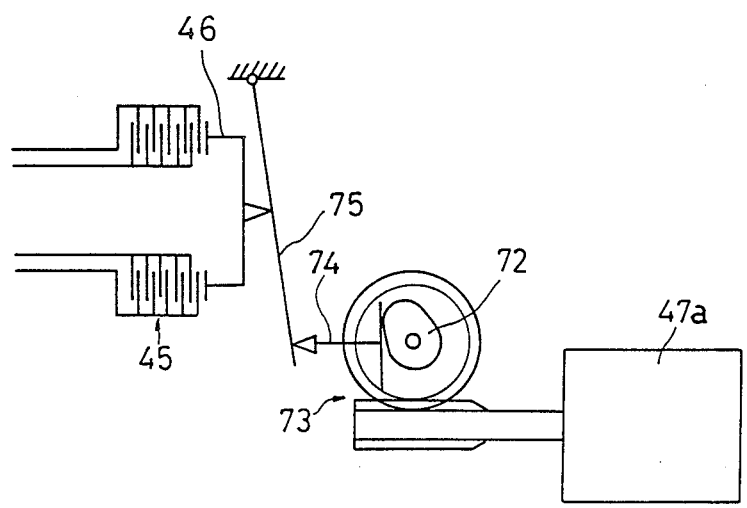

The example shown in FIG. 19 is that the cam 72 and the cam follower 74 are employed as a torque-thrust conversion mechanism. And to amplify the torque the worm gear 73 is employed, and the lever 75 is employed to transmit the force to the pressing rod 46 and to amplify the force. Due to the above, the stroke of the pressing rod 46 is determined by the rotation angle of the cam 72, and moreover the cam 72 is controlled by the revolution or the rotative angle of the servo motor 47a.

Figure 20:
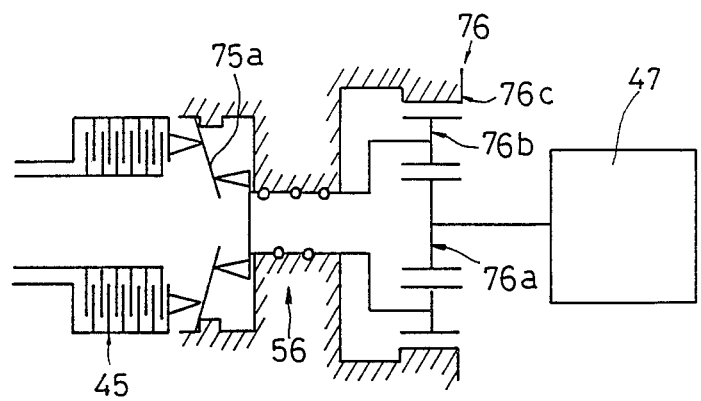

The example shown in FIG. 20 is that the planetary gear mechanism 76 comprising the sun gear 76a, the pinion 76b and the ring gear 76c is employed, and the lever 75a is employed to convey the thrust force generated from the ball bolt mechanism 56 to the friction clutch 45 and to amplify the force.

Figure 21:
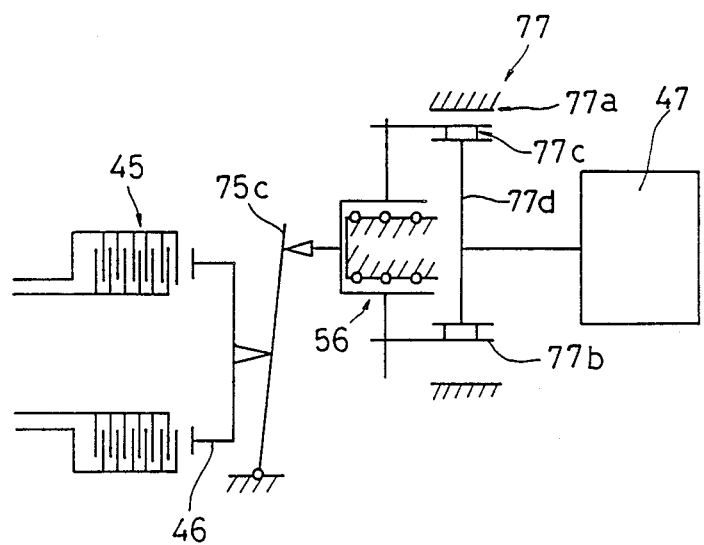

The example shown in FIG. 21 is that to amplify the torque the "harmonic drive" 77 comprising the inner spline 77a, the outer spline 77b, the bearing 77c and the elliptical cam 77d, and the lever 75c is employed to convey the thrust force generated from the ball bolt mechanism 56 to the pressing rod 46 and to amplify the force.

The explanations stated here are for the embodiments applied to the clutch in the transfer device of the four wheel drive motor vehicle. Not limited to this, the present invention is also applicable to the clutches and brakes employed in the automatic transmission, and moreover is applicable to other clutches and brakes.

As explained, according to the present invention, the torque which is generated from a torque generator such as the motor, etc. is directly converted into the thrust force by the torque-thrust conversion mechanism along with the amplification of force. Because of the above, the engaging force of the frictional engaging device is electrically and directly controlled, so the control is easy, the better response is obtained and the mechanism itself is structured simply. Furthermore effective control is obtained by eliminating the loss caused by the energy conversion.

What is claimed is:

1. An actuator for a transfer mechanism for a four wheel drive vehicle, said transfer mechanism transferring torque from a transmission to at least one of a front wheel side output member and a rear wheel side output member, said actuator comprising:
    a friction clutch connected to the front wheel side output member and the rear wheel side output member, said friction clutch controlling torque distribution to the front and rear wheel side output members,
    a non-rotating casing for receiving the friction clutch therein,
    an electric motor situated outside the casing,
    a reduction mechanism connected to the electric motor, said reduction mechanism reversibly reducing rotational number of the motor,
    a torque-thrust conversion mechanism situated inside the casing and connected to the reduction mechanism, said torque-thrust conversion mechanism reversibly converting rotation force transmitted from the reduction mechanism to linear movement,
    a pressing member for pressing the friction clutch, and
    a thrust bearing situated between the pressing member and the torque-thrust conversion mechanism so that when the electric motor is actuated, the friction clutch is moved smoothly and accurately to control distribution of torque between the front and rear wheel side output members, the front and rear wheel side output members being drivingly connected to front and rear wheels, respectively, of the four wheel drive vehicle.

2. An actuator for according to claim 1, wherein said friction clutch is a center differential clutch for restricting differential operation of a center differential device which distributes torque to the front and rear wheel side output members.

3. An actuator for according to claim 1, wherein said friction clutch is a multi-plate friction clutch.

4. An actuator for according to claim 1, wherein said torque-thrust conversion mechanism is a ball thread mechanism.

5. An actuator for according to claim 1, wherein said torque-thrust conversion mechanism includes an elastic member for providing force in the direction of movement of the torque-thrust conversion mechanism.

6. An actuator for according to claim 5, wherein said elastic member is a coned spring.

7. An actuator for according to claim 1, wherein said torque-thrust conversion mechanism is a cam mechanism.

8. An actuator for according to claim 7, wherein said cam mechanism comprises two cam members, one cam member rotating relative to the other.

9. An actuator for according to claim 11, wherein said torque-thrust conversion mechanism includes a lever which increases power based on lever ratio.

10. An actuator for transmitting torque from one member to another member, comprising:
    a first hollow shaft (36),
    a second hollow shaft (37) situated outside the first hollow shaft (36),
    a friction clutch (45) connected to the shafts (36), (37) at side portions thereof, said shafts (36), (37) engaging together when the friction clutch (45) is actuated,
    a case (13) for covering the shafts (36), (37) and friction clutch (45),
    an electric motor (47) situated outside the case (13),
    a reduction gear (61) situated inside the case (13) and connected to the electric motor (47), said reduction gear (61) being located at a side of the clutch opposite to the shafts (36), (37),
    a torque-thrust conversion mechanism situated inside the case (13) and located adjacent to the friction clutch (45) at the same side as the reduction gear (61), said torque-thrust conversion mechanism being connected to the reduction gear (61) so that when the electric motor (47) is actuated, the torque-thrust conversion mechanism rotates through the reduction gear (61) to thereby move toward the friction clutch (45),
    a pressing member (46) situated adjacent to the friction clutch (45) at the side of the clutch opposite to the shafts (36), (37), and
    a thrust bearing (57) situated between the torque-thrust conversion mechanism and the pressing member (46) so that when the electric motor (47) is actuated, the torque-thrust conversion mechanism moves toward the friction clutch (45), whereby the friction clutch (45) is substantially directly pushed by means of the thrust bearing (57) and the pressing member (46) to thereby connect the hollow shafts (36), (37) together.

* * * * *

UNITED STATES PATENT AND TRADEMARK OFFICE
CERTIFICATE OF CORRECTION

PATENT NO. : 4,895,236

DATED : January 23, 1990

INVENTOR(S) : Shiro Sakakibara et al

It is certified that error appears in the above-identified patent and that said Letters Patent is hereby corrected as shown below:

At cover page, Foreign Application Priority Data, change "Feb. 2, 1987" to --Feb. 20, 1987--.

Signed and Sealed this

Eighteenth Day of December, 1990

*Attest:*

HARRY F. MANBECK, JR.

*Attesting Officer*　　　　*Commissioner of Patents and Trademarks*